(12) United States Patent
Souers

(10) Patent No.: US 10,830,325 B2
(45) Date of Patent: Nov. 10, 2020

(54) TORQUE CONVERTER WITH TURBINE SHELL AND TURBINE HUB

(71) Applicant: SCHAEFFLER TECHNOLOGIES AG & CO. KG, Herzogenaurach (DE)

(72) Inventor: Long Souers, North Canton, OH (US)

(73) Assignee: SCHAEFFLER TECHNOLOGIES AG & CO. KG, Herzogenaurach (DE)

(*) Notice: Subject to any disclaimer, the term of this patent is extended or adjusted under 35 U.S.C. 154(b) by 0 days.

(21) Appl. No.: 16/285,494

(22) Filed: Feb. 26, 2019

(65) Prior Publication Data

US 2020/0271206 A1 Aug. 27, 2020

(51) Int. Cl.
*F16H 41/28* (2006.01)
*F16H 41/04* (2006.01)

(52) U.S. Cl.
CPC ............. *F16H 41/28* (2013.01); *F16H 41/04* (2013.01)

(58) Field of Classification Search
CPC .. F16H 41/28; F16H 41/04; F16H 2045/0247; F16H 2045/0221
See application file for complete search history.

(56) References Cited

U.S. PATENT DOCUMENTS

| | | | | |
|---|---|---|---|---|
| 5,224,576 A * | 7/1993 | Fujimoto | ................. | F16H 45/02 192/212 |
| 6,585,091 B2 * | 7/2003 | Reinhart | ................... | F16F 1/34 192/203 |
| 6,595,335 B2 * | 7/2003 | Schroder | ................. | F16H 45/02 192/3.29 |
| 6,817,834 B2 * | 11/2004 | Takabayashi | ........... | F16H 41/28 416/180 |
| 6,851,531 B2 * | 2/2005 | Sasse | ....................... | F16H 45/02 192/3.29 |
| 7,476,080 B2 * | 1/2009 | Sato | ........................ | F16H 41/28 228/175 |
| 9,316,273 B2 * | 4/2016 | Saka | ........................ | F16H 45/02 |
| 9,382,989 B2 * | 7/2016 | Tomiyama | ............ | F16F 15/134 |
| 9,797,494 B2 * | 10/2017 | Depraete | ................. | F16H 47/08 |
| 9,845,854 B2 * | 12/2017 | Depraete | ................. | F16H 41/30 |
| 2006/0096823 A1 * | 5/2006 | Maeda | ..................... | F16H 45/02 192/3.29 |
| 2015/0267795 A1 | 9/2015 | Gurney | | |
| 2017/0045113 A1 * | 2/2017 | Ito | ..................... | F16F 15/12373 |
| 2017/0108050 A1 * | 4/2017 | Lee | ........................... | F16D 3/12 |
| 2017/0159783 A1 * | 6/2017 | Depraete | ........... | F16F 15/12353 |

OTHER PUBLICATIONS

U.S. Appl. No. 16/201,504, filed Nov. 27, 2018.
U.S. Appl. No. 16/246,795, filed Jan. 14, 2019.

* cited by examiner

*Primary Examiner* — Thomas E Lazo

(57) ABSTRACT

A torque converter having a two-part turbine is provided. The torque converter includes an impeller rotatable about an axis. A turbine is axially spaced from the impeller and rotatable about the axis. The turbine includes a turbine shell and a turbine hub non-rotatably fixed to the turbine shell. In embodiments, the turbine hub and the turbine shell do not overlap in an axial face-to-face contacting relationship. In embodiments, the turbine hub and the turbine shell each terminate at an end surface that face one another in direct connection. The connection of the turbine hub and the turbine shell may be at a location of a bulge or apex of the turbine so as to inhibit turbine deflection of that location during operation of the torque converter.

12 Claims, 2 Drawing Sheets

TORQUE CONVERTER WITH TURBINE SHELL AND TURBINE HUB

TECHNICAL FIELD

The present disclosure relates to a torque converter of an automotive vehicle, and more particularly to a turbine of a torque converter.

BACKGROUND

Torque converters are known in the art. Torque converters typically include a pump (or impeller), a turbine, and a stator. As the pump spins, fluid inside the torque converter is forced outwardly and then toward the turbine, causing the turbine to spin. The turbine is typically indirectly connected to a transmission (e.g., gearbox) of the vehicle such that spinning of the turbine provides force to move the vehicle.

SUMMARY

In one embodiment, a torque converter includes an impeller rotatable about an axis, and a turbine axially spaced from the impeller and rotatable about the axis. The turbine includes a turbine shell and a turbine hub non-rotatably fixed to the turbine shell. The turbine hub and the turbine shell do not overlap in an axial face-to-face contacting relationship.

The turbine shell and the turbine hub may be connected or connectable via an interference fit. In another embodiment, the turbine shell and the turbine hub may be connected or connectable via a weld or brazing.

The turbine shell may terminate at an inner end surface, the turbine hub terminates at an outer end surface, and the inner and outer end surfaces may be directly connected to one another, at the termination of the turbine shell at the turbine hub.

The turbine hub and the turbine shell may be connected at a location that defines an axial apex or bulge of the turbine, which bulges or apexes in an axial direction. This apex or bulge may be a location slightly radially inward from blades of the turbine, but radially outward from other components such as a rivet or bearing connected to a stator of the torque converter.

In another embodiment, a torque converter includes a two-part turbine rotatable about an axis and having a turbine shell and a turbine hub, wherein the turbine shell ends at an inner end surface, and the turbine hub ends at an outer end surface, wherein the outer end surface is directly and non-rotatably connected to the inner end surface.

In another embodiment, a method for commonizing a torque converter across different vehicular platforms is provided. The method includes providing a plurality of identical turbine shells for implementation into a torque converter rotatable about an axis, each identical turbine shell having an inner end; providing a plurality of first turbine hubs each having a first thickness and a first outer end; providing a plurality of second turbine hubs each having a second thickness and a second outer end, the second thickness differing from the first thickness; connecting the inner end of one of the identical turbine shells with the first outer end of one of the first turbine hubs to form a first turbine; and connecting the inner end of one of the identical turbine shells with a second outer end of one of the second turbine hubs to form a second turbine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A torque converter can be found in typical automatic transmission vehicles. Torque converters are a type of fluid coupling that transfers rotating power or torque from a prime mover (e.g., engine) to a rotating driven load (e.g., gearbox) so that the torque can ultimately reach the wheels. Torque converters are typically located between the engine's flexplate and the transmission. Torque converters typically include three rotating elements: an impeller, which is mechanically driven by the prime mover; a turbine, which drives the load; and a stator, which is interposed between the impeller and turbine so that it can alter oil flow returning from the turbine to the impeller.

When extreme loads are placed on the torque converter, the turbine has a potential to deflect, which can lead to the turbine contacting or hitting the impeller. Turbine deflection is typically difficult to predict due to the difficulty in easily understanding thrust load in the back shell of the turbine. Attempts to solve this problem have been developed, including increasing the turbine wall thickness, changing the stamping form to make the turbine more stiff, and adding stiffening plates.

Figure 1:
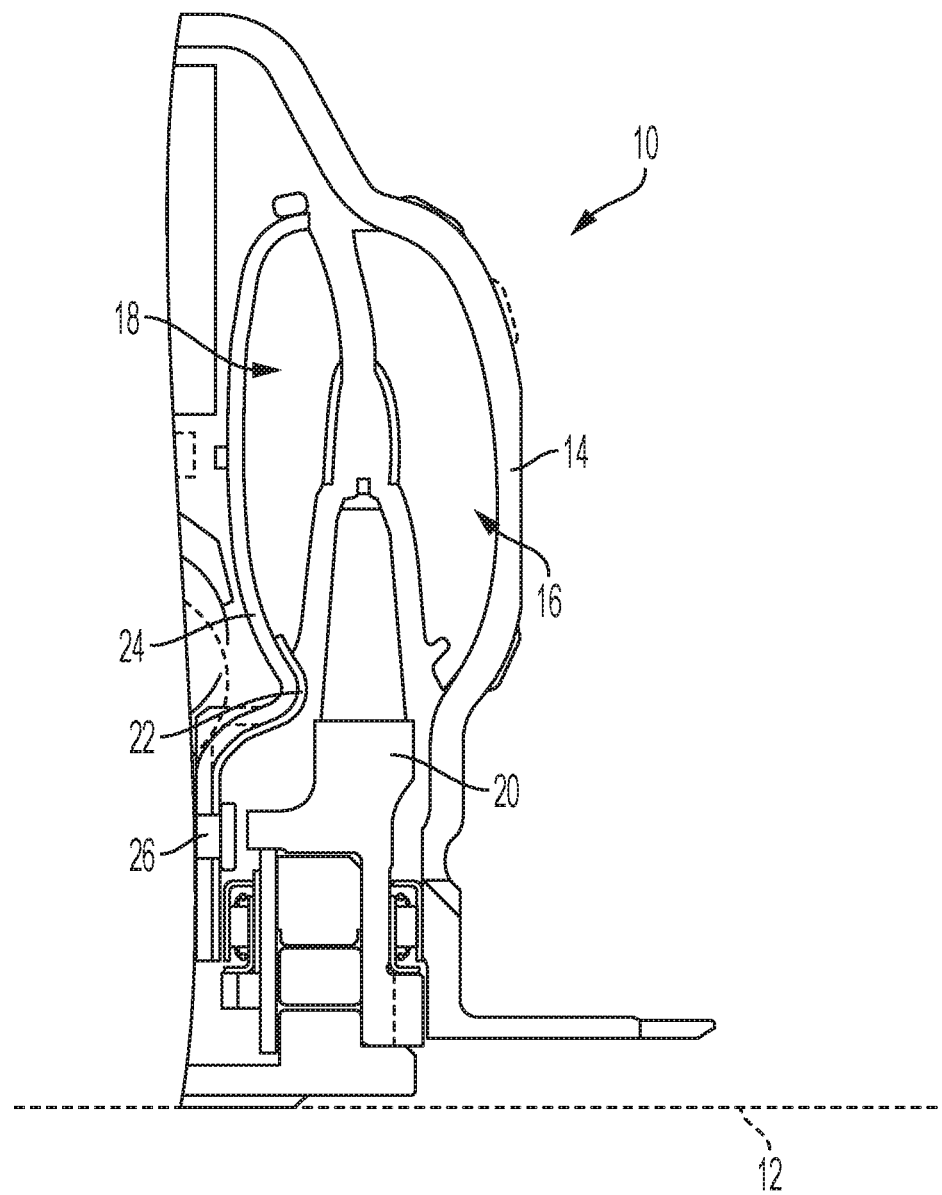
FIG. 1 is a cross-sectional view of a portion of a torque converter with a turbine equipped with a stiffening plate, according to one embodiment.

FIG. 1 illustrates a portion of a torque converter 10 with such a stiffening plate added as an attempt to reduce turbine deflection. The basic layout of the torque converter explained in this paragraph can be applied to the torque converter of FIG. 2A, with differences explained below. Referring back to FIG. 1, at least some portions of the torque converter 10 are rotatable about a central axis 12. While only a portion above the axis is shown in FIG. 1, it should be understood that the torque converter can appear substantially similar below the axis with many components extending about the axis. Words such as "axial," "radial," "circumferential," "outward," etc. as used herein are intended to be with respect to the central axis 12. Power from a vehicle engine (not shown) can be transmitted to a transmission via fluid, and via the torque converter. In particular, the power may first be transmitted to a front cover (not shown) of the torque converter 10, which is integrally connected to or fastened to a rear cover 14 of the torque converter which forms a shell of an impeller or pump 16, such that the impeller 16 rotates as the front cover and rear cover 14 rotate. The impeller 16 includes blades that, when rotated about the axis 12, push the fluid outwardly. The fluid pushes against a turbine 18 of the torque converter, causing the turbine 18 to revolve about the axis 12. A stator 20 functions to return the fluid from the turbine 18 back to the impeller 16 with minimal or no power loss. Drive power is transmitted from the turbine 18 to an input shaft of the transmission. The turbine 18 may also be connected to a damper assembly (not shown) positioned between the turbine 18 and the front cover to dampen the torque before the torque transfers from the turbine to the input shaft of the transmission.

The turbine 18 is provided with a stiffening plate 22 as an attempt to reduce turbine deflection, explained above. The stiffening plate 22 can be connected to an inner surface of the turbine 18. In the embodiment shown in FIG. 1, the stiffening plate 22 is fastened to a shell 24 of the turbine 18 via a fastener 26 such as a rivet which, in turn, fastens the turbine 18 to another component such as a plate of a damper assembly. The stiffening plate 22 can be a problematic solution to turbine deflection, however. For example, the stiffening plate is an additional part and therefore adds costs. Also, the stiffening plate requires additional steps of assembly. Moreover, if a fastener is used to attach the stiffening plate 22 to the turbine shell 24, the fastener may have to pass through both of those components along with another component such as a damper plate. Also, with space and packaging within the torque converter at a premium, any stiffening plate attached to the inside of the torque converter can disrupt the packaging and reduce the amount of interior space available within the torque converter for the fluid.

Therefore, according to various embodiments described below, the torque converter is provided with two parts: a turbine shell and a turbine hub. The turbine shell and the turbine hub can be two separate components that are non-rotatably fixed to one another (e.g., via welding, brazing, interference fit, etc.) as will be described. The turbine hub can be thicker in the axial direction than the turbine shell, which reduces turbine deflection. This also allows the turbine shell to be commonized across various platforms, with changes required to only the dimension of the turbine hub (and not the turbine shell) required to vary the characteristics of the turbine deflection.

Figure 2A:
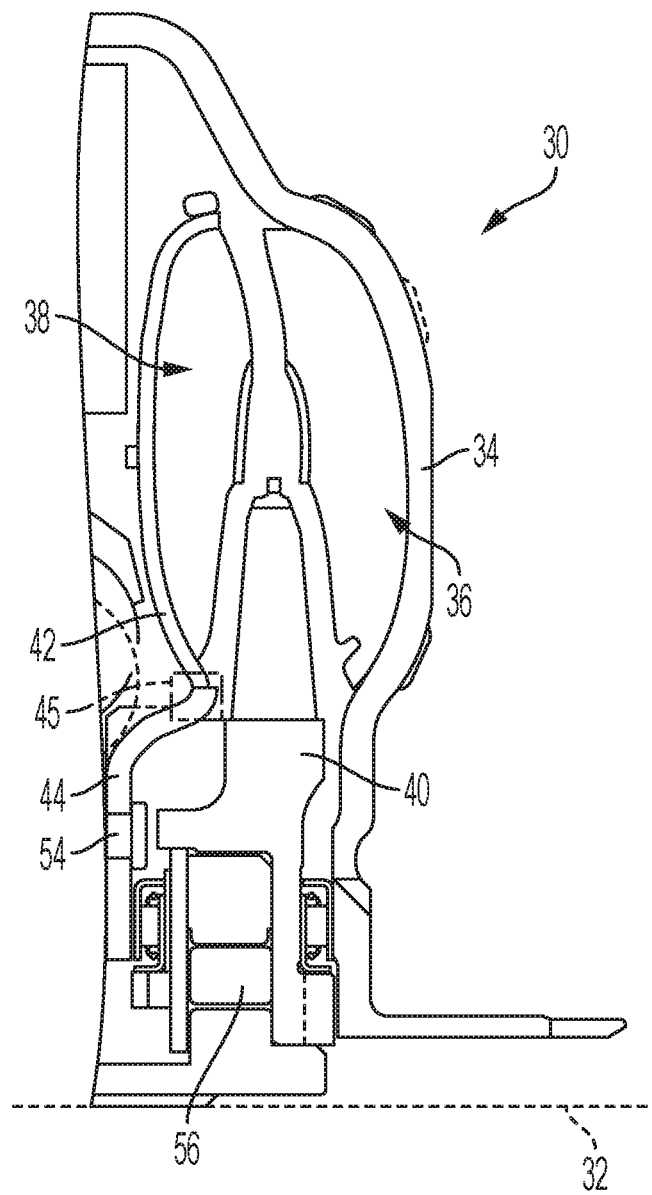
FIG. 2A is a cross-sectional view of a portion of a torque converter with a turbine shell fixed to a turbine hub, according to one embodiment.

FIG. 2A illustrates one embodiment of a torque converter 30 configured to prevent or inhibit turbine deflection. Some of the components of the torque converter 30 are rotatable about a central axis 32. The torque converter 30 includes components such as an impeller, a turbine, and a stator that operate similarly to those of FIG. 1 unless otherwise explained. The torque converter includes a rear cover 34 which forms a shell of an impeller or pump 36, such that the impeller 36 rotates as the front cover and rear cover 34 rotate. The torque converter 30 also includes a turbine 38 and a stator 40 which perform similar features as in FIG. 1.

Figure 2B:
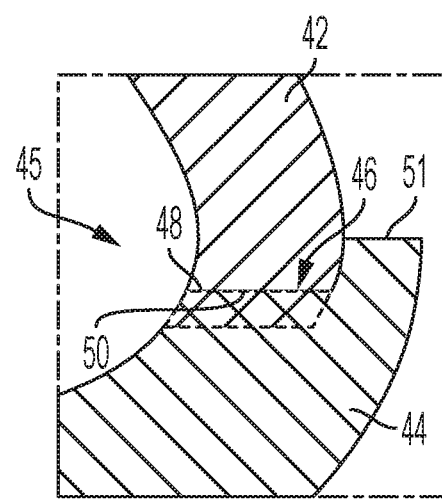
FIGS. 2B and 2C are enlarged views of a region of FIG. 2A, illustrating examples of various attachments between the turbine shell and the turbine hub.
Figure 2C:
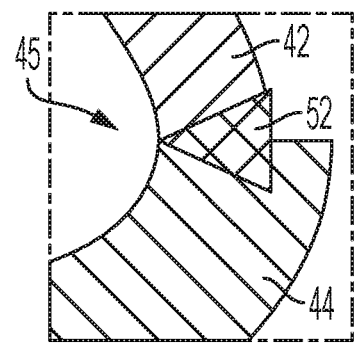

Unlike the turbine 18 of the torque converter 10 of FIG. 1, the turbine 38 of the torque converter 30 of FIG. 2 includes both a turbine shell 42 and a turbine hub 44. The shell 42 and the hub 44 are originally two separate components, but are integrally connected together during assembly. FIGS. 2B and 2C show two different examples of connections between the turbine shell 42 and the turbine hub 44 at location 45.

Referring to FIG. 2B, an interference fit (also referred to as a shrink fit or a press fit) between the turbine shell 42 and the turbine hub 44 is shown generally at 46. With an interference fit, the external dimension of one part slightly exceeds the internal dimension of the part into which it has to fit. In other words, the outer dimension of the turbine hub 44 can slightly exceed the internal dimension of the turbine shell 42 before the hub 44 and shell 42 are pressed together into engagement. This creates a tight fit, and the force required to cause an interference fit can require the use of power equipment.

The turbine shell 42 can terminate at an inner end having an inwardly-facing end surface 48. Likewise, the turbine hub can terminate at an outer end having an outwardly-facing end surface 50. The interference fit can be between these two surfaces. The interference fit 46 can also include spline cutting of the inwardly-facing end surface 48 of the shell 42 and the outwardly-facing end surface 50 of the hub 44. In this embodiment, the turbine shell 42 has a first spline feature and the turbine hub 44 has a second spline feature mated with the first spline feature such that the turbine shell and the turbine hub are connected via a spline connection such that they rotate together.

Referring to FIG. 2C, a welded or brazed connection 52 is shown between the turbine shell 42 and the turbine hub 44. No additional spline features are needed in the shell 42 or the hub 44. The shell 42 can simply be engaged with the hub in a face-to-face manner, and then welded or brazed to form a non-rotatable connection therebetween.

As evident in FIGS. 2A-2C, this embodiment allows the turbine hub 44 to be thicker than the turbine shell 42 so that the hub 44 can combat turbine deflection. For example, the turbine hub 44 being thicker than the connected turbine shell 42 can leave a shoulder 51 of the turbine hub 44 that extends beyond the turbine shell 42. While the shoulder is shown on the rear side of the torque converter (e.g., to the right in FIG. 2A), the shoulder 51 may also exist on the opposite side of the turbine shell 42 (e.g., on the left of the turbine shell 42). The increased thickness of the turbine hub 44 allows the turbine shell 42 to be commonized throughout multiple vehicle platforms, with the hub 44 being the only part required for variation if different deflection-inhibiting characteristics are desired. This was previously not possible, as turbine shells are typically stamped from a single sheet of metal and therefore have a constant thickness throughout.

The location 45 of the connection between the turbine shell 42 and the turbine hub 44 can be at an apex of a curve or bulge. For example, as can be seen in FIG. 2A, the turbine turns inward (e.g., to the right in FIGS. 2A-2C) at a precise location of the connection between the turbine shell 42 and the turbine hub 44. The added thickness of the turbine hub 44 is therefore present at a precise location where deflection might otherwise occur, and at a location that is closest to the impeller 36. This location 45 is located slightly radially inwardly of the blades of the turbine, but radially outward from other components such as the rivet 54, or a bearing 56 connected to the stator 40. Also, in this location, there is no axial face-to-face connection between the turbine shell 42 and the turbine hub 44. In other words, there is no axially-facing outer face of the turbine shell 42 that overlaps and directly contacts a corresponding axially-facing outer face of the turbine hub 44.

As shown in FIG. 2A, the turbine hub 44 is connected to another component, such as a plate of a dampener, via a rivet 54 for example. With no stiffening plate required in this embodiment, the rivet 54 may pass through only the turbine hub 44 and the other component.

Description provided above involves fixing a turbine hub to a turbine shell to form a combined turbine hub and shell. Attachment of the turbine hub and shell to other components within a torque converter assembly can vary. For example, the turbine shell may be fixed onto the turbine hub by welds or brazing, as described below, which is fixed onto the damper assembly by fasteners (e.g., sheet metal rivets) or by welds. This fixes the damper pendulum, retainer plate and the turbine hub together. In one embodiment, the turbine hub is fixed to the damper assembly's pendulum on the same sheet metal rivets that fix the retainer plate and the pendulum together, and then that assembly is fixed (e.g., welded or brazed) onto the turbine shell. In another embodiment, the turbine hub is first welded or brazed to the turbine shell, and then the turbine hub of the combined hub and shell is fixed (e.g., welded or brazed) to the pendulum of the damper assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

10 torque converter
12 axis
14 rear cover
16 impeller or pump
18 turbine
20 stator
22 stiffening plate
24 turbine shell
26 rivet
30 torque converter
32 axis
34 rear cover
36 impeller or pump
38 turbine
40 stator
42 turbine shell
44 turbine hub
45 location of connection of turbine shell and turbine hub
46 interference fit
48 inner surface of turbine shell
50 outer surface of turbine hub
51 shoulder
52 weld or braze
54 rivet
56 bearing

What is claimed is:

1. A torque converter comprising:
an impeller rotatable about an axis; and
a turbine axially spaced from the impeller and rotatable about the axis, the turbine including a turbine shell and a turbine hub non-rotatably fixed to the turbine shell, wherein the turbine hub and the turbine shell do not overlap in an axial face-to-face contacting relationship, wherein the turbine shell and the turbine hub are connectable via an interference fit.

2. The torque converter of claim 1, wherein the turbine shell terminates at an inner end surface, and the turbine hub terminates at an outer end surface, and the inner and outer end surfaces are connected via interference fit.

3. The torque converter of claim 1, wherein the turbine shell has a first thickness, and the turbine hub has a second thickness that exceeds the first thickness.

4. The torque converter of claim 3, wherein the turbine hub includes a shoulder that extends beyond the first thickness at a location of connection between the turbine shell and the turbine hub.

5. The torque converter of claim 1, wherein the turbine hub is coupled to a dampening plate via a fastener.

6. The torque converter of claim 1, wherein the turbine hub and the turbine shell are connected at a location that defines an axial apex of the turbine.

7. A torque converter comprising:
a two-part turbine rotatable about an axis and having a turbine shell and a turbine hub, wherein the turbine shell ends at an inner end surface, and the turbine hub ends at an outer end surface, wherein the outer end surface is directly and non-rotatably connected to the inner end surface, wherein the turbine shell includes a first spline feature, and the turbine hub includes a second spline feature that mates with the first spline feature to non-rotatable couple the turbine shell with the turbine hub.

8. The torque converter of claim 7, wherein the inner end surface and the outer end surface are connected at a location in which the turbine bulges in an axial direction.

9. The torque converter of claim 8, wherein the turbine hub includes a shoulder that extends beyond a thickness of the turbine shell at a location of connection between the turbine shell and the turbine hub.

10. The torque converter of claim 7, wherein the turbine shell and the turbine hub are connected via an interference fit.

11. A method for commonizing a torque converter across different vehicular platforms, the method comprising:
providing a plurality of identical turbine shells for implementation into a torque converter rotatable about an axis, each identical turbine shell having an inner end;
providing a plurality of first turbine hubs each having a first thickness and a first outer end;
providing a plurality of second turbine hubs each having a second thickness and a second outer end, the second thickness differing from the first thickness;
connecting the inner end of one of the identical turbine shells with the first outer end of one of the first turbine hubs to form a first turbine; and connecting the inner end of one of the identical turbine shells with a second outer end of one of the second turbine hubs to form a second turbine, wherein the first step of connecting includes providing an interference fit between the inner end of one of the identical turbine shells with the first outer end of one of the first turbine hubs.

12. The method of 11, wherein the second step of connecting includes providing an interference fit between the inner end of one of the identical turbine shells with the second outer end of one of the second turbine hubs.

* * * * *